Figure 1:
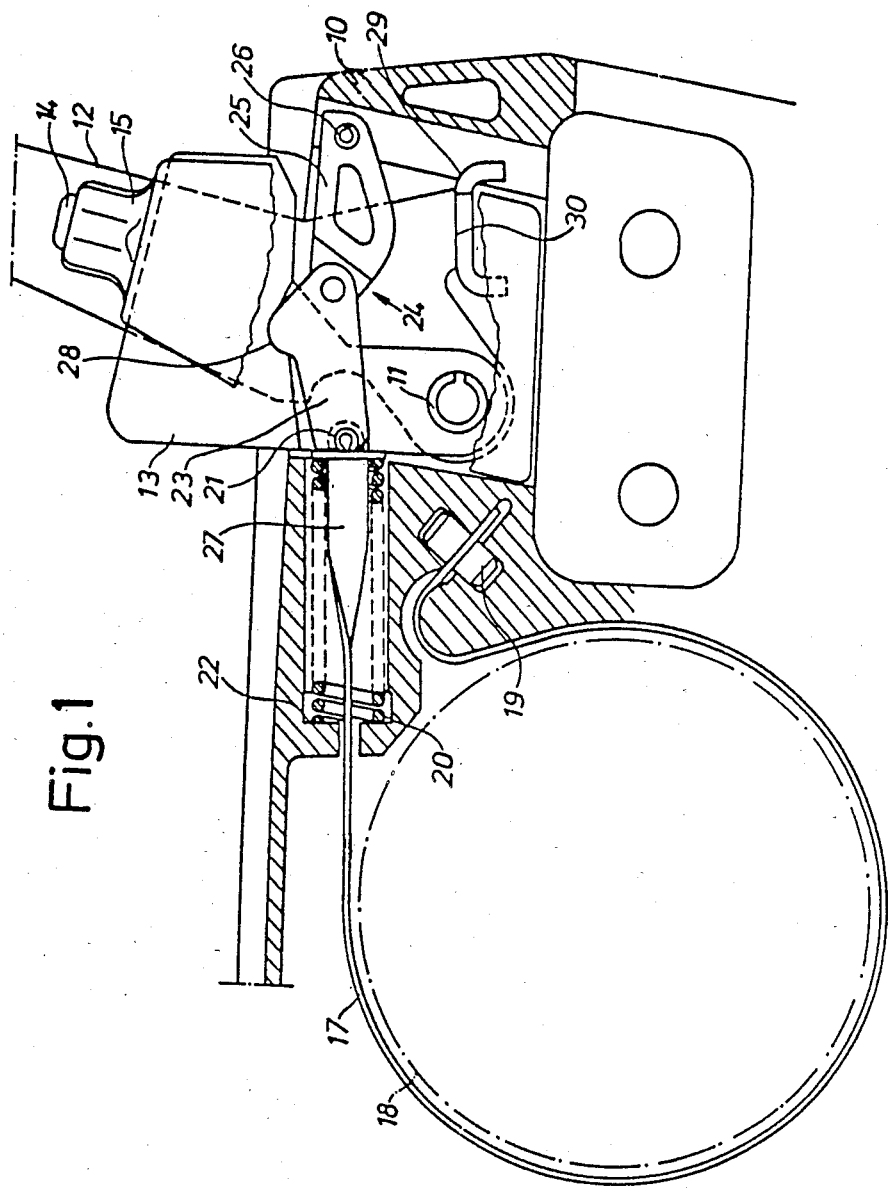

United States Patent [19]

Farquhar

[11] Patent Number: 4,593,796
[45] Date of Patent: Jun. 10, 1986

[54] BRAKE OPERATING DEVICE

[75] Inventor: George N. Farquhar, Alingsås, Sweden

[73] Assignee: Emab Electrolux Motor Aktiebolag, Huskvarna, Sweden

[21] Appl. No.: 732,804

[22] Filed: Jun. 7, 1985

Related U.S. Application Data

[63] Continuation of Ser. No. 490,332, May 2, 1983, abandoned.

[30] Foreign Application Priority Data

May 11, 1982 [SE] Sweden ............................... 8202949

[51] Int. Cl.⁴ ............................................... F16D 51/00
[52] U.S. Cl. ..................................... 188/77 R; 30/381; 188/166
[58] Field of Search .................. 188/77 R, 77 W, 178, 188/166, 181, 135, 139, 174, 82.6, 105; 30/381, 382, 383; 192/129 R, 130, 81 C

[56] References Cited

U.S. PATENT DOCUMENTS

| | | | |
|---|---|---|---|
| 3,923,126 | 12/1975 | Bidanset | 188/77 W |
| 4,121,339 | 10/1978 | Nikolich | 188/77 R X |
| 4,324,045 | 4/1982 | Höppner et al. | 30/383 X |
| 4,370,810 | 2/1983 | Schurr et al. | 30/382 |

*Primary Examiner*—Bruce H. Stoner, Jr.
*Assistant Examiner*—Michael P. Gilday
*Attorney, Agent, or Firm*—Alfred E. Miller

[57] ABSTRACT

An automatic brake operating device to be used on a motor chain saw provided with a clutch drum around which there is a pretensioned brake band. By use of a spring and a toggle joint the band can be switched between a free position and a braking position. The toggle joint is operated between two corresponding positions by an inertia mass for releasing and a stirrup for resetting. The mass and the stirrup are individually movable and capable of triggering the brake independent of each other.

6 Claims, 3 Drawing Figures

BRAKE OPERATING DEVICE

This application is a continuation, of application Ser. No. 490,332, filed May 2, 1983, now abandoned.

The present invention relates to the brake of a motor chain saw including a pretensioned brake band positioned around a clutch drum to be put into action by an inertia mass at a sudden acceleration of the saw body at the occurrence of a so-called kick-back.

Motor chain saws with brake devices operated by an inertia mass arrangement without the saw operator's influence on the procedure are known in the prior art, and have long been an object of development towards safer and more useful constructions. Among such mechanisms one can be noted which by means of a spring and a toggle joint can be switched between a free position and a braking position, such that the toggle joint is operated between two corresponding positions by means of a protection stirrup serving as an inertial mass at the front handle of the saw. The feature of triggering by inertia has proved in development that the triggering force and the braking time can be essentially reduced. Moreover, improper triggering is avoided, if certain conditions for the co-operation between mass and motions of the parts are fulfilled. These essential properties of the present invention can be concluded as follows.

(1) The rest position of the inerti mass by a tensioned mechanism is determined directly by a shoulder on the toggle joint.

(2) The shoulder is positioned on a first half of the joint close to the enter thereof where a triggering force is required and less sensibility to disturbances is achieved.

(3) The center of gravity of the inertia mass and the contact surface to the toggle joint are nearly coinciding so that wear of the contact surfaces because of vibrations is as small as possible.

(4) The center of gravity is positioned near to a line through the pivot of the mass perpendicular to the longitudinal direction of the sword, at least within a sector of 25° on each side of this line.

(5) A connecting line between the pivots of the toggle joint forms a tangent to the braking drum.

(6) The ratio of the inertia mass and the parts of the toggle joint together is >5.

(7) The brake spring forms in the tensioned position of the mechanism a retaining force on the inertia mass in rest position.

Most of the foregoing result in a definite improvement on the principle of inertia triggering and are adopted in the device defined in claim 1.

An embodiment of such a device is described in the following specification with reference to the accompanying drawings, in which FIG. 1 is a vertical projection of a triggering mechanism in a tensioned position and in FIG. 2 the same mechanism is shown in a position released by the inertia mass and in FIG. 3 the same mechanism is shown in a manually released position.

The device herein described is positioned in the vicinity of the sword attachment of a motor saw, and in the Figures only the members necessary to make the device work are shown. It is mounted in the motor saw body below a part of the motor saw housing 10 which in the Figures is partly cut out. On a shaft 11 a protection stirrup 12 and an inertia mass 13 are journalled. The stirrup is provided with a groove 14 into which the corner of a resilient plate flange 15 fixed to the housing snaps in when the stirrup is set in the normal position (FIG. 1). The corner slides out of the groove when the stirrup is turned forwards or backwards and then forms a resistance to the motiion so that the stirrup cannot swing to and fro unimpededly. A force just overcoming this resistance is the least triggering force required for manual triggering of the chain brake (FIG. 3).

The inertial mass 13 has a loose running fit on the shaft 11 and is extended parallel to the lower end of the stirrup. On the front end of the mass is a step 16 which during the forward turning of the stirrup hits the stirrup so that the mass and the stirrup move in parallel forwards. A common turning like this brings about a manual release (FIG. 3).

The chain brake is here shown as a conventional pretensioned band brake with a band 18 turned one revolution around a clutch drum 17 and fastened to the saw body by means of a pin 19. The spring applying the band to the drum when released is here a helical spring 20 with fixing points at a pin 21 in the band and at the bottom of a hole 22 in the saw body, respectively. At the pin 21 one leg 23 of a toggle joint 24 is journalled and shown in FIG. 1 in a tensioned position. The other leg 25 is by means of another pin 26 journalled in the saw body at a point on an extended line from the projecting end 27 of the hand through the spring 20. In the tensioned position according to FIG. 1 the toggle joint has three supports: the pins 21, 26 and a curved recess 28 in the inertia mass. This position is stable as long as the mass is retained in itsprimary position which it is during normal operation of the saw.

Figure 2:
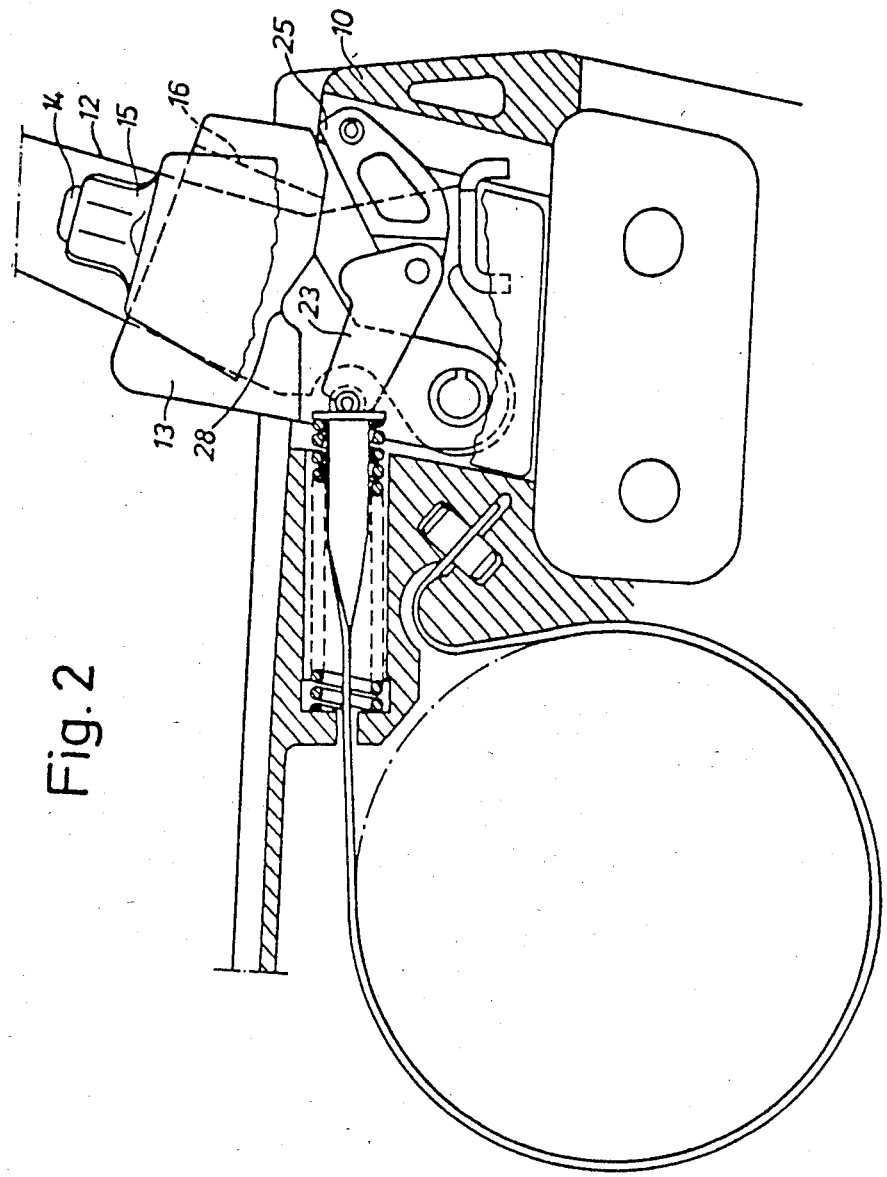
Figure 3:
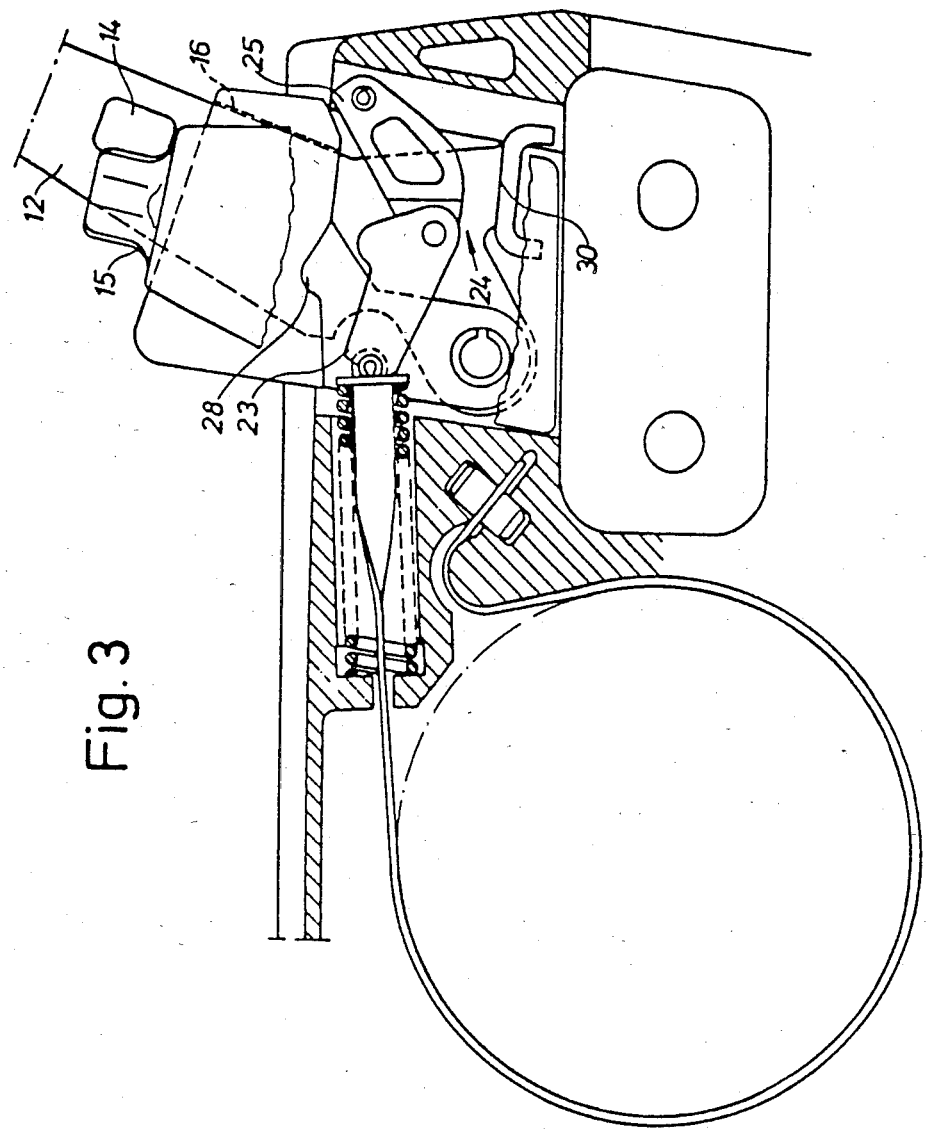

At the occurrence of an impact on the front of the saw a reaction force and a torque on the saw arise which make the mass rotate forwards in relation to the saw, whereby the support in the recess 28 is brought downwards so that the toggle joint tips over from the tensioned position according to FIG. 1 into the relaxed position according to FIG. 2. The spring 20 tightens the band around the drum which is then braked to stop. In this way an automatically performed release of the brake by the inertia mass has passed. As said before, the stirrup can also be used as a brake release, in that case as a manual release. An unintentional release is carried out by the operator when his hand during a kick-back comes off the carrying handle and hits the stirrup. The way of manual release is intended to be a complement to the automatic one.

When the brake has been released in any of these ways it shall be reset into free position before the operation can be restarted. The resetting is carried out in such a way that the toggle joint is transferred into the tensioned position (FIG. 1). The member used for this is a lever arm 29 in the lower end of the stirrup 12 forming a step 30 which by turning the stirrup backwards lifts the toggle joint upwards to the mass 13 so that the toggle joint again supports itself in the points 21, 26, 28. The end of the band 17 is pressed a little backwards whereby the band drops the contact with the drum.

The embodiment described is an example how to exercise the invention. The members for tensioning the brake spring, the band etc. can, of course, be varied without exclusion of the inventive idea which is defined in the claims.

I claim:

1. In a brake operating device for the brake of a motor chain saw, the chain saw having a determined longitudinal direction, a brake drum, a brake band around the brake drum, a toggle having a pair of legs having first ends coupled together to define a joint, one of said legs being pivoted to a free end of said brake band, and a spring biasing said toggle, whereby the toggle is switchable between a braking position and a free position in which positions said toggle has relaxed and pretensioned positions respectively; the improvement wherein said brake operating device further comprises an inertia mass pivotally mounted on a fixed pivot point for controlling the movement of said toggle upon sudden acceleration of said chain saw, said spring being positioned to pretension said band in said relaxed position of said toggle, said inertia mass being positioned to control said toggle to maintain said spring in a ready position said inertia mass engaging said toggle substantially at said joint on a point of said inertia mass substantially at its center of gravity, whereby pivotal movement of said inertia mass urges said toggle to its relaxed position, the center of gravity of said inertia mass being positioned within a sector of 25 degrees relative to said pivot point on either side of a line extending through said pivot point of said mass and perpendicular to said longitudinal direction, the other leg of said toggle joint being pivoted to a fixed point of said chain saw, the line interconnecting said stationary pivot and the pivot between said one leg and said brake band extending to form a tangent with said brake drum.

2. The brake operating device of claim 1, wherein said retainer means is positioned on one of said legs of said toggle joint near the center joint said pair of legs.

3. The brake operating device of claim 1, wherein said retainer, in the tensioned position of said toggle joint is positioned substantially at the center of gravity of said inertia mass.

4. The brake operating device of claim 1, wherein said chain saw further comprises a stirrup pivoted to said chain saw and positioned to be controlled by an operator, said stirrup being positioned to engage said inertia mass for movement of said toggle joint to said free position.

5. The brake operating device of claim 4, wherein said inertia mass and stirrup are pivoted on a common axis.

6. The brake operating device of claim 1, wherein said retainer comprises a recess of said inertia mass, said recess being positioned to engage one of said legs of said toggle joint adjacent the center of said toggle joint, in the tensioned position of said toggle joint.

* * * * *